United States Patent
Adebjörk et al.

(10) Patent No.: US 6,782,742 B1
(45) Date of Patent: Aug. 31, 2004

(54) REDUNDANT SYSTEM FOR THE INDICATION OF HEADING AND ATTITUDE IN AN AIRCRAFT

(75) Inventors: Peter Adebjörk, Linköping (SE); Per-Johan Nordlund, Linköping (SE); Carl-Olof Carlsson, Linköping (SE)

(73) Assignee: Saab AB, Linköping (SE)

( * ) Notice: Subject to any disclaimer, the term of this patent is extended or adjusted under 35 U.S.C. 154(b) by 0 days.

(21) Appl. No.: 09/889,311

(22) PCT Filed: Jan. 12, 2000

(86) PCT No.: PCT/SE00/00034
§ 371 (c)(1),
(2), (4) Date: Aug. 31, 2001

(87) PCT Pub. No.: WO00/42482
PCT Pub. Date: Jul. 20, 2000

(30) Foreign Application Priority Data

Jan. 18, 1999 (SE) .............................. 9900113

(51) Int. Cl.⁷ .............................................. G01P 13/00
(52) U.S. Cl. .................................. 73/170.01; 73/170.02
(58) Field of Search ............................... 356/350, 484; 701/3; 73/170.02, 170.01

(56) References Cited

U.S. PATENT DOCUMENTS 4,914,598 A 4/1990 Krogmann et al.
5,841,537 A * 11/1998 Doty .......................... 356/484
6,161,062 A 12/2000 Sicre et al.

FOREIGN PATENT DOCUMENTS

WO WO97/26553 7/1997

* cited by examiner

Primary Examiner—Edward Lefkowitz
Assistant Examiner—Andre Allen
(74) Attorney, Agent, or Firm—Swidler Berlin Shereff Friedman, LLP

(57) ABSTRACT

A method and an arrangement for synthetically calculating redundant attitude and redundant heading by means of existing data in an aircraft. In one embodiment the heading of the aircraft is available and in another embodiment the heading is calculated from a magnetic heading sensor. When the heading is available (redundant heading) attitude is calculated by weighting together the signals from and angular rate gyros (2) in the aircraft's flight control system, information from air data (altitude, speed, angle of attack) as well as information about heading (redundant heading). When the heading is not available, attitude and heading are calculated in one embodiment with the aid of Kalman filters (11, 22) by weighting together the signals from the angular rate gyros in the aircraft's control system, information from air data (altitude, speed, angle of attack and sideslip angle) as well as information from a magnetic heading detector existing in the aircraft.

10 Claims, 3 Drawing Sheets

REDUNDANT SYSTEM FOR THE INDICATION OF HEADING AND ATTITUDE IN AN AIRCRAFT

TECHNICAL FIELD

The invention relates to a system function which provides display of heading and attitude on displays in an aircraft, for example a head-up display (HUD), in the event of failures in certain equipment for normal attitude display. The system function, which in English is called Attitude and Heading Reference System and is abbreviated AHRS with reference to its initials, supplements the aircraft's normal display for heading and attitude. This display is intended to help the pilot to recover from difficult attitudes and then facilitate return to base/landing.

PRIOR ART

In order not to lose attitude and heading display in an aircraft in the event of failure of a normally-used inertial navigation system (INS) a redundant system is required. In good visibility a pilot can fly by using the horizon as an attitude reference, but with great uncertainty as to the heading. In bad weather, in cloud and at night when the horizon is not visible, the pilot can easily become disoriented and thereby place the aircraft and him/herself in hazardous situations.

AHRS systems calculate, independently of normal systems, attitude angles (pitch and roll) and heading. Such a system continuously displays the position to the pilot on a display in the cockpit. The need for a redundant system for attitude may be so great that an aircraft is not permitted to fly without one.

Redundant systems in the form of an AHRS unit are available today. Such a unit contains among other things gyros which measure aircraft angle changes in pitch, roll and yaw. It also contains accelerometers and magnetic sensor. The accelerometers are used to establish a horizontal plane. The magnetic sensors are used to obtain a magnetic north end. This type of AHRS system in the form of hardware is costly and involves the installation of heavy, bulky equipment on the aircraft. To overcome this there is proposed in this description a synthetic AHRS which uses sensors existing in the aircraft, which are not normally intended for AHRS calculation and which therefore partly have significantly lower performance, instead of sensors of the type included in an AHRS unit.

The angles are calculated with the aid of existing sensors in the aircraft. The aim is to use existing angular rate gyro signals and support these with calculations based on other available primary data in the aircraft. Angular rate gyros are normally used in control systems and generally have substantially greater drift than gyros for navigation.

DESCRIPTION OF THE INVENTION

According to one aspect of the invention, a method is provided for synthetically calculating redundant attitude and redundant heading by means of data existing in an aircraft as specified in the claims.

Different forms of embodiment have been developed. In one embodiment the heading of the aircrafts available and in another embodiment the heading is calculated on the basis of a magnetic heading sensor. When the heading is available the calculations can be substantially reduced.

When the heading is available (redundant heading) attitude is calculated by weighting together the signals from the angular rate gyros in the flight control system of the aircraft, information from air data (altitude, speed, angle of attack) and information about heading (redundant heading).

When the heading is not available, attitude and heading are calculated according to one embodiment with the aid of Kalman filters by weighting together the signals from the angular rate gyros in the aircraft's control system, information from air data (altitude, speed, angle of attack and sideslip angle) as well as information from an existing magnetic heading detector in the aircraft.

One advantage of a synthetic AHRS according to the aspect of the invention is that it works out substantially cheaper than conventional AHRS system based on their own sensors if existing sensors in the aircraft can be used. This also saves space and weight in the aircraft.

DESCRIPTION OF EMBODIMENT

Figure 1:
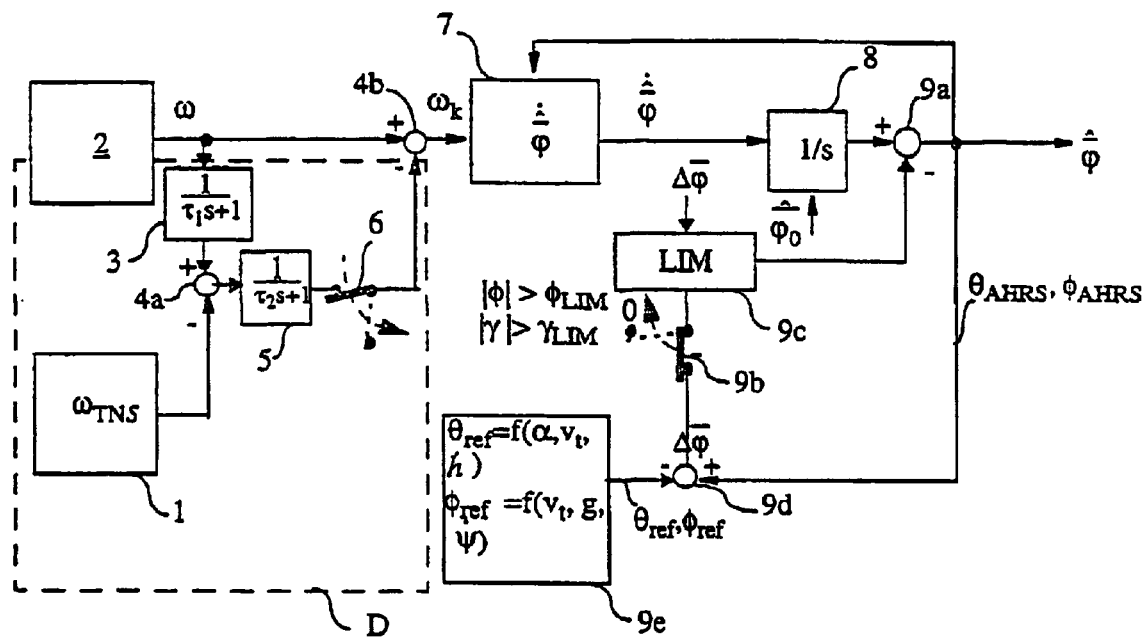
FIG. 1 shows a schematic diagram of an AHRS function in which the heading is available.

A number of embodiments are described below with the support of the figures. According to the invention, methods are provided for synthetically calculating attitude and heading by means of data existing in the aircraft as specified in the claims.

In a simpler embodiment, the heading of the aircraft is available. In another embodiment the heading is calculated, in this case on the basis of a magnetic heading sensor.

Calculation of AHRS when the heading is known

The signals from the three angular rate gyros 2 rigidly mounted on the body frame are used to determine the orientation of the aircraft relative to the reference coordinate system N (navigation frame). The angular rate gyros 2 measure angular velocities around the three body-frame coordinate axes (x, y, z). The angular velocities are normally designated $\omega_x$ or p (rotation around the x-axis), $\omega_y$ or q (rotation around the y-axis) and $\omega_z$ or r (rotation around the z-axis). The orientation between the body-frame coordinate system B (body) and the N system is given by the euler angles $\theta$, $\phi$ and $\psi$. However, since the heading is known, only $\theta$ and $\phi$ are of interest. With the assumption that the N system is an inertial system and is oriented so that its z-axis is parallel to the g vector of the earth, it can be shown that $$\begin{bmatrix} \dot{\theta} \\ \dot{\phi} \end{bmatrix} = \begin{bmatrix} \omega_y \cos\phi - \omega_z \sin\phi \\ \omega_x + \tan\theta(\omega_y \sin\phi + \omega_z \cos\phi) \end{bmatrix} \quad (1)$$

If the gyros 2 were ideal, the initial values $\phi_0$ and $\theta_0$ were error-free and if the integration method used were accurate, attitude angles can be obtained by solving Eqn (1). In practice, however, none of these preconditions is satisfied; instead, sensor errors etc cause the solution to diverge and relatively soon to become unusable.

Sensor errors in the form of among others zero errors, scale factor errors, misaligned mounting and acceleration-induced drifts constitute the dominant sources of error. In level flight the zero error is the error source that dominates error growth.

Owing to sensor imperfections and uncertainty in initial values, equation (1) gives an estimate of roll and pitch angle derivatives according to $$\dot{\hat{\varphi}} = \begin{bmatrix} \dot{\hat{\theta}} \\ \dot{\hat{\phi}} \end{bmatrix} = \begin{bmatrix} \omega_y \cos\hat{\phi} - \omega_z \sin\hat{\phi} \\ \omega_x + \tan\hat{\theta}(\omega_y \sin\hat{\phi} + \omega_z \cos\hat{\phi}) \end{bmatrix} \quad (2)$$

The difference between the expected $\hat{\varphi}_{AHRS}$ (calculated by the AHRS function) and the "actual" $\overline{\varphi}_{ref}$ (from air data, primary data calculated) attitude angles constitutes an estimate of the attitude error $$\Delta\overline{\varphi} = \hat{\varphi}_{AHRS} - \overline{\varphi}_{ref} \quad (3)$$

See below concerning the use of $\Delta\overline{\varphi}$.

Finally the attitude angles are given as $$\hat{\varphi}_{AHRS} = \int_t (\dot{\hat{\varphi}})dt + \hat{\varphi}_0 - \lim(\Delta\overline{\varphi}) \quad (4)$$

where $\hat{\varphi}_0$ constitutes estimated initial values.

Calculation of $\overline{\varphi}_{ref}$

The formula $\theta_{ref} = \arcsin(\dot{h}/v_t) + (\alpha^* \cos\phi)$ is used when calculating $\theta_{ref}$. $\dot{h}$ is a high-pass-filtered altitude signal. $v_t$ is true airspeed.

The formula $\phi_{ref} = \arctan(v_t^*(\dot{\psi})/g)$ is used when calculating $\phi_{ref}$.

$\dot{\psi}$ is a high-pass-filtered heading (redundant heading) signal.

Zero correction of the angular rate gyros

The zero errors in the angular rate gyros 2 are heavily temperature-dependent. It may take 20 to 30 minutes for the gyros to reach operating temperature. This means that an INS failure shortly after take-off might give large zero errors if flying continued. However, it takes a certain time from gyros 2 receiving voltage to the aircraft taking off, which means that part of the temperature stabilisation has been completed when a flight begins. It is also assumed that landing can take place within a short time in the event of an INS failure during takeoff. To mininise zero errors from the angular rate gyros 2 a zero correction of the angular rate gyros is performed by software. This involves comparing the ω (p, q and r) signals from the angular rate gyros 2 with the corresponding signal from the INS, see eqn (5), by generating a difference in 4a. The difference is low-pass-filtered in a filter 5 and added to the angular rate gyro signals in a difference generator 4b, where the signal $\omega_k$ which designates the zero-error-corrected gyro signals and is used instead of ω in the AHRS calculations. This is done continuously as long as the INS is working. In the event of an INS failure the most recently performed zero corrections are used for the rest of the flight.

$$\omega_{TNS} = \begin{bmatrix} p_{TNS} \\ q_{TNS} \\ r_{TNS} \end{bmatrix} = \begin{bmatrix} \dot{\phi}_{TNS} - \dot{\psi}_{TNS} \sin\theta_{TNS} \\ \dot{\theta}_{TNS} \cos\phi_{TNS} + \dot{\psi}_{TNS} \cos\theta_{TNS} \sin\phi_{TNS} \\ -\dot{\theta}_{TNS} \sin\phi_{TNS} + \dot{\psi}_{TNS} \cos\theta_{TNS} \cos\phi_{TNS} \end{bmatrix} \quad (5)$$

A block diagram of the realisation of the AHRS function with zero correction of the angular rate gyros is shown in FIG. 1. The figure gives a schematic illustration of the AHRS function. The zero correction of the angular rate gyros is performed by the units inside the dashed area D. $\psi_{TNS}$, $\theta_{TNS}$ and $\phi_{TNS}$ are high-pass-filtered to obtain $\dot{\psi}_{TNS}$, $\dot{\theta}_{TNS}$ and $\dot{\phi}_{TNS}$. These are used in Eqn (5), which gives $\omega_{TNS}$ ($p_{TNS}$, $q_{TNS}$, $r_{TNS}$) in a first block 1. ω (p, q, r) which are obtained as signals from the gyros designated by 2 are low-pass-filtered in a low-pass filter 3, before the difference is generated in 4a.

The difference signal between the $\omega_{TNS}$ ($p_{TNS}$, $q_{TNS}$, $r_{TNS}$) signals and the ω (p, q, r) signals is low-pass-filtered with a long time-constant in a low-pass filter 5, ie its mean value is generated over a long time. The filter 5 is initalised at take-off rotation with the shorter time-constant. After a power failure, the filter 5 is initialised instantaneously.

In block $\dot{\hat{\varphi}}$ is calculated, after which the integration according to Equation (4) is performed in an integrator 8, to which the initial conditions $\hat{\varphi}_0$ are added. In a difference generator 9a the signal $\Delta\overline{\varphi}$ is added, but is disconnected by means of a switch 9b under certain changeover conditions, as for example when $|\gamma| > \gamma_{LIM}$ and $|\phi| > \phi_{LIM}$. The $\Delta\overline{\varphi}$ signal passes through a limiter 9c. The magnitude of the output signal from the limiter 9c is dependent on the magnitude of the $\Delta\overline{\varphi}$ signal (ie the input signal to limiter 9c). The $\Delta\overline{\varphi}$ signal is generated according to Equation (3) in a difference generator 9d to which are added calculated $\hat{\varphi}_{AHRS}$ attitude angles and "actual" $\overline{\varphi}_{ref}$ attitude angles from sensors (primary data) designated with 9e.

Figure 2:
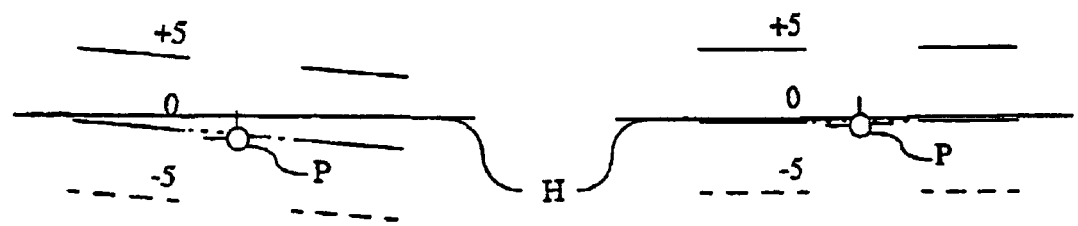
FIG. 2 shows the principle for levelling of the attitude of the aircraft in a head-up display, to the left without levelling and to the right with levelling.

Despite compensations, the calculated angles from the AHRS contain minor zero errors. Since the output signals are used for head-up display, this is corrected by using Δφ in roll and Δθ in pitch to level the SI image until a stable position is obtained. See FIG. 2, where the line H symbolises the actual horizon and where an aircraft is represented by P. Note that this leveling of the HUD only takes place when one is within the limits described above.

AHRS calculation when the heading is also to be calculated

Figure 3:
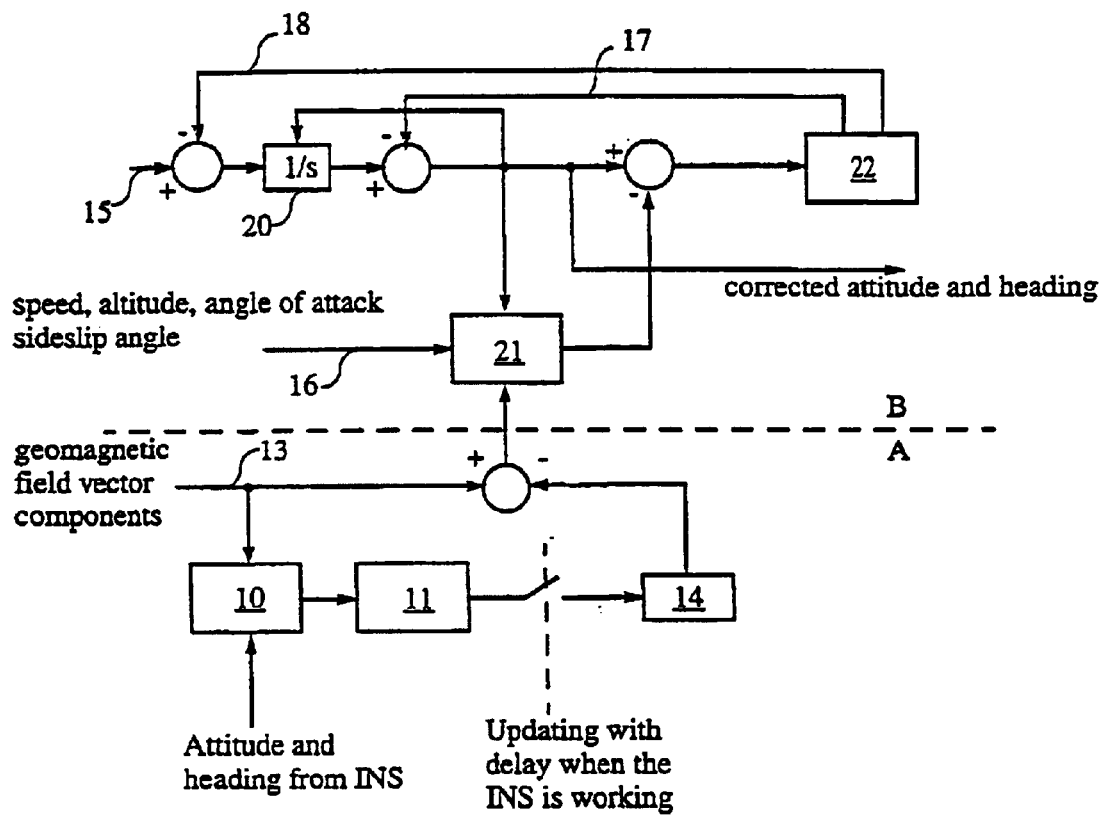
FIG. 3 shows the block diagram of a redundant system for both attitude and heading.

FIG. 3 shows schematically the modules that form building blocks for another variant of a synthetic AHRS and how these modules are linked together to create a redundant attitude and a redundant heading.

FIG. 3 shows the principle of the redundant system in accordance with the aspect of the invention. The system consists of two subsystems A and B; the first subsystem A performs estimation of any errors in the measured geomagnetic field and the other subsystem B performs calculation of redundant attitude and heading. In all, this results in five building blocks, where a first measurement routine 10 and a first Kalman filter 11 constitute the building blocks in the first subsystem A and further where the integration routine (1/s) 20, measurement routine 21 and a second Kalman filter 22 constitute the building blocks in the second subsystem B.

With measurement routine 10, measured field vector components in the body fame coordinate system are transformed, to a north-, east- and vertically-oriented coordinate system called the navigation frame. The transformation takes place with the aid of attitude and heading from the inertial navigation system of the aircraft, INS, via wire 12. The field vector components of the geomagnetic field are taken from a magnetic heading sensor in the aircraft and arrive via wire 13. In the first Kalman filter 11, the errors in the field vector components are then estimated on the basis of knowledge about the nominal nature of the components, after which the estimated values are stored in a memory 14.

Subsystem A (measurement routine 10 and Kalman filter 11) are used only when the INS is working correctly. In the event of INS failure, the latest possible estimate of the errors in the field vector components is used, ie that which has been stored in memory 14. Since it may be difficult in many cases to decide whether the INS is working as it should, the absolutely last estimate should not be used. In order to solve this, the estimates of errors in the measured geomagnetic field that are used are at least one flight old, ie the estimates that are stored in the memory from the previous flight or earlier.

The integration routine 20 receives information about angular velocities, in this case for the three coordinate axes x, y and z in the body frame. These are normally designated $\omega_x$ or p (rotation around the x-axis), $\omega_y$ or q (rotation around the y-axis) and $\omega_z$ or r (rotation around the z-axis). The information is taken from the angular rate gyros of the control system and is fed via wire 15 to routine 20 which integrates out attitude and heading via a transformation matrix.

The second measurement routine 21 consists of a developed variant of the first measurement routine 11 and uses the field vector components derived from the first measurement routine 11. In addition, a roll and pitch angle are calculated with the aid of data from existing air data and existing slip sensors, data which arrives to measurement routine 21 via wire 16 to measurement routine 21. By means of the second Kalman filter 22 the attitude and heading errors that arise on integration of the angular rate gyro signals of the control system are primarily calculated. Secondarily, Kalman filter 22 is used to estimate the biases in the angular rate gyros, ie the biases in p, q, and r.

The first measurement routine 10

The geomagnetic field can be calculated theoretically all over the world. To do this, the IGRF (International Geomagnetic Reference Field) is used, for example.

The field vector in the body frame is designated here with $B_B$ and the field vector in the navigation frame with $B_N$. Further, the three components of the field vector are designated in accordance with $$B=[B_x, B_y, B_z]^T. \quad (6)$$

With the aid of the transformation matrix $C_B^N$, which transforms a vector from body frame to navigation frame, we have:

$$B_N = C_B^N \cdot B_B, \quad (7)$$

where $C_B^N$ has the appearance $$C_B^N = \begin{bmatrix} c_{11} & c_{12} & c_{13} \\ c_{21} & c_{22} & c_{23} \\ c_{31} & c_{32} & c_{33} \end{bmatrix} \quad (8)$$

The transformation matrix $C_B^N$ is calculated with the aid of attitude and heading, $\theta$, $\phi$, $\psi$, from the INS.

The difference between a measured field vector and a field vector calculated in accordance with the model will be $$B_{N, measured} - B_{N, calculated} = C_B^N \cdot \delta B_B$$

where $\delta$ designates the difference between the measured and the calculated quantity. The left-hand part of Eqn (9) becomes the output signal from the first measurement routine 10 and thus the input signal to Kalman filter 11. Further, the right-hand part of Eqn (9) is used in Kalman filter 11, which is evident from the description of the first Kalman fitter 11 below.

The first Kalan filter 11

Given the state model $$x_{k+1} = F_k x_k + w_k$$

$$z_k = H_k x_k + e_k, \quad (10)$$

a Kalman filter works in accordance with:

Time updating $$x_{k+1}^- = F_k x_k^+$$

$$P_{k+1}^- = F_k P_k^+ F_k^T + Q_k, \quad (11)$$

where $P_{k+1}^-$ is the estimated uncertainty of the states after time updating.

Measurement updating $$K_{k+1} = P_{k+1}^- H_{k+1}^T [H_{k+1} P_{k+1}^- H_{k+1}^T + R_{k+1}]^{-1}$$

$$x_{k+1}^+ = x_{k+1}^- + K_{k+1}[z_{k+1} - H_{k+1} x_{k+1}^-]$$

$$P_{k+1}^+ = P_{k+1}^- - K_{k+1} H_{k+1} P_{k+1}^-, \quad (12)$$

where $P_{k+1}^+$ is the estimated uncertainty of the states after measurement updating.

The errors in the field vector components are modelled according to $$\begin{bmatrix} \delta B_x \\ \delta B_y \\ \delta B_z \end{bmatrix} = \begin{bmatrix} b_x \\ b_y \\ b_z \end{bmatrix} + \begin{bmatrix} s_x & k_{xy} & k_{xz} \\ k_{yx} & s_y & k_{yz} \\ k_{zx} & k_{zy} & s_z \end{bmatrix} \cdot \begin{bmatrix} B_x \\ B_y \\ B_z \end{bmatrix}, \quad (13)$$

where b are biases, s are scale factor errors and k is a cross-coupling from one component to another (for example, index xy refers to how the y-component affects the x-component). These 12 errors can represent the states in the first Kalman filter 11 according to $$x_k = [b_x b_y b_z s_x s_y s_z k_{xy} k_{xz} k_{yz} k_{yx} k_{zx} k_{zy}]^T \quad (14)$$

and each of the state equations looks like this $$x_{k+1} = x_k + w_k, \quad (15)$$

where the index k designates the time-discrete count-up in time.

In Eqn (15), $w_k$ is a weakly time-discrete process noise to model a certain drift in the errors. Eqn (15) means that the prediction matrix becomes the unit martix and the covariance matrix for the process noise will be the unit matrix multiplied by $\sigma_w^2$, where $\sigma_w$ is typically set to one hundred-thousandth (dimensionless since the field vector components are normalised to the amount 1 before they are used).

Where measurement updating of Kalman filter 11 is concerned, Eqn (9) is used and the measurement matrix looks like this $$H_k = \begin{bmatrix} c_{11} & c_{12} & c_{13} & c_{11}B_x & c_{12}B_y & c_{13}B_z & c_{11}B_y & c_{11}B_z & c_{12}B_z & c_{12}B_x & c_{13}B_x & c_{13}B_y \\ c_{21} & c_{22} & c_{23} & c_{21}B_x & c_{22}B_y & c_{23}B_z & c_{21}B_y & c_{21}B_z & c_{22}B_z & c_{22}B_x & c_{23}B_x & c_{23}B_y \\ c_{31} & c_{32} & c_{33} & c_{31}B_x & c_{32}B_y & c_{33}B_z & c_{31}B_y & c_{31}B_z & c_{32}B_z & c_{32}B_x & c_{33}B_x & c_{33}B_y \end{bmatrix} \qquad (16)$$

Owing to unmodelled interference, the measured geomagnetic field vector will deviate from the model, both in direction and in amount. The simplest variant is to model this interference as a constant white measurement noise with the aid of the measurement noise covariance matrix $R_k$. The standard deviations for the measurement noise for the three field vector component measurements are each typically set to one-tenth (dimensionless because the field vector components are normalised to 1 before they are used).

A Chi2 test is used to avoid the impact of bad measurements. In addition, the measurements of the field vector components are not used if the angular velocities are too high. The reason for this is that various time delays exert an effect at high angular velocities.

Integration routine 20

It can be shown that the time-derivative of the transformation matrix $C_B^N$ becomes $$\dot{C}_B^N = C_B^N \cdot W_{IB} - W_{IN} \cdot C_B^N. \qquad (17)$$

In Eqn (17) $W_{IB}$ and $W_{IN}$ are, respectively, B's (body frame) rotation relative to I (inertial frame) and N's (navigation frame) rotation relative to I. Both are written in matrix form. Since we are concerned with redundant attitude and redundant heading, where the requirements for attitude errors are of the order of 2 degrees, whilst the elements in $W_{IN}$ are of the order of 0.01 degrees, $W_{IN}$ is disregarded. The expression in (17) will then be $$\dot{C}_B^N = C_B^N \cdot W_{IB}, \qquad (18)$$

where $W_{IB}$ is the angular rate gyro signals from the angular rate gyros of the control system.

In principle Eqn (18) means that there are nine differential equations. Because of orthogonality, only six of these need be integrated and the other three can be calculated with the aid of the cross-product.

The second measurement routine 21

The second measurement routine 21 consists of a developed variant of the first measurement routine 11, in which the expansion consists of calculating the roll and pitch angles with the aid of data from air data (altitude and speed) and the slip sensors (angle of attack and sideslip angle).

In the first measurement routine 11 it is assumed that only the field vector components are incorrect and that attitude and heading are correct. This assumption is reasonable because the field vector components are resolved with the aid of attitude and heading from the INS. In the second measurement routine 21 this is not satisfied, and consideration must also be given to attitude and heading errors. The field vector used in the second measurement routine is compensated for errors estimated in subsystem A.

Errors in both the field vector and the transformation matrix mean that $$B_{N,\,Measured} = \hat{C}_B^N \cdot B_{B,\,Measured} \qquad (19)$$

where $\hat{C}_B^N$ stands for calculated transformation matrix and means that $$\hat{C}_B^N = C_B^N + \delta C_B^N. \qquad (20)$$

If we use (20), generate the difference between measured and calculated field vector and disregard error products, we get $$B_{N,\,Measured} - B_{N,\,Calculated} \approx \delta C_B^N \cdot B_{N,\,Measured} + \hat{C}_B^N \cdot \delta B_B. \qquad (21)$$

In the second measurement routine 21, roll and pitch angle are calculated with the aid of altitude, speed, angle of attack and sideslip angle. The pitch angle can be calculated according to $$\theta_{ref} = \mathrm{asin}\left(\frac{\dot{h}}{v}\right) + \cos(\phi)\alpha + \sin(\phi)\beta \qquad (22)$$

To be able to calculate the pitch angle according to the expression in Eqn (22) an altitude derivative is required. This altitude derivative is not directly accessible and must instead be calculated on the basis of existing altitude which is obtained from air data. The calculation is done according to $$\dot{h} = \dot{h}(n) = \frac{1}{\tau}\left(\left(\tau - \frac{1}{f_s}\right) \cdot \dot{h}(n-1) + h(n) - h(n-1)\right), \qquad (23)$$

ie a high-pass filtering of the altitude. The symbols and $\tau$ in Eqn (23) represent respectively the time-constant of the filtering and the sampling frequency. The speed v used in Eqn (22) is approximately $v_t$ (true speed relative to the air). By approximately we mean that, when calculating $v_t$, measured temperature is not used, which is the normal case, but a so-called standard temperature distribution is used here instead.

Further, the roll angle can be calculated according to $$\phi_{ref} = a\,\tan\,v\dot{\psi}/g. \qquad (24)$$

The expression in Eqn (24) applies only for small roll and pitch angles, small angular velocities and moreover when the angles of attack and the sideslip angles are small.

The above two expressions are calculated and compared with the attitude that is calculated via the integration routine by generating the difference according to $$\phi - \phi_{ref} = \mathrm{atan}\frac{c_{32}}{c_{33}} - \mathrm{atan}\frac{v(c_{33} \cdot \omega_z + c_{32} \cdot \omega_y)}{g(c_{11}^2 + c_{21}^2)} \qquad (25)$$

$$\phi - \phi_{ref} =$$

$$\mathrm{atan}\frac{-c_{31}}{\sqrt{1-c_{31}^2}} - \left(\mathrm{asin}\left(\frac{\dot{h}}{v}\right) + \cos\left(\mathrm{atan}\frac{c_{32}}{c_{33}}\right)\alpha + \sin\left(\mathrm{atan}\frac{c_{32}}{c_{33}}\right)\beta\right),$$

where $$\phi = \mathrm{atan}\frac{c_{32}}{c_{33}} \qquad (26)$$

$$\theta = \mathrm{atan}\frac{-c_{31}}{\sqrt{1-c_{31}^2}}$$

$$\dot{\psi} = \frac{c_{33} \cdot \omega_z + c_{32} \cdot \omega_y}{c_{11}^2 + c_{21}^2}.$$

The second Kalman filter 22

The second Kalman filter 22 can be said to be the heart of the system. Here are estimated the attitude and heading errors that arise on integration of the angular rate gyro signals from the flight control system. Also estimated are the zero errors in the field vector components of the angular rate gyro signals. Further, possible residual errors in the field vector components, ie the errors that the first Kalman filter 11 cannot reach are estimated here. All in all, this means nine states: three for attitude and heading errors, three for the zero errors in the angular rate gyro signals and three for residual errors in the field vector components (three zero errors). Attitude and heading errors are represented by a rotation of the body-frame system from a calculated to a true coordinate system. The error in $\hat{C}_B^N$ can be written $$\delta C_B^N = \hat{C}_B^N - C_B^N = C_B^N \cdot C_{\hat{B}}^B - C_B^N = C_B^N \cdot (C_{\hat{B}}^B - I). \tag{27}$$

One can ascertain that $$C_{\hat{B}}^B = \begin{bmatrix} 1 & -\gamma_z & \gamma_y \\ \gamma_z & 1 & -\gamma_x \\ -\gamma_y & \gamma_x & 1 \end{bmatrix} = \Gamma + I, \tag{28}$$

where $\Gamma$ is the matrix form of $\gamma = [\gamma_x, \gamma_y, \gamma_z]^T$ and I is the unit matrix (T means transponate).

The elements of the vector $\gamma$ describe a small rotation around the respective axis between actual (true) and calculated body frame system. The corresponding differential equations for the elements of $\gamma$ can be derived to $$\dot{\gamma} = \delta\omega, \tag{29}$$

where $\delta\omega$ is the errors in the angular rates from the angular rate gyros.

The errors in the angular rates are modelled as three first-order Markov processes according to $$\dot{\delta\omega} = -\frac{1}{\tau_\omega}\delta\omega + u_\omega \tag{30}$$

where the time-constant $\tau_\omega$ is set typically to a number of hours and the three $\mu_\omega$ to typically less than one degree/second.

Residual errors in the field vector components are modelled (the zero errors) in a similar way, ie $$\dot{b} = -\frac{1}{\tau_b}b + u_b \tag{31}$$

where $\tau_b$ is set typically to a number of hours, and $u_b$ is set typically to a few hundredths (dimensionless because the field vector components are normalised to 1 before they are used).

This gives a state vector according to $$x_k = [\gamma_x, \gamma_y, \gamma_z, \delta\omega_x, \delta\omega_y, \delta\omega_z, b_x, b_y, b_z]^T \tag{32}$$

and a prediction matrix according to $$F_k I + \int_t^{t+\Delta T} A(\tau) d\tau, \tag{33}$$

where $A(\tau)$ is the matrix that described the time-continuous state equations as above. The covariance matrix for the process noise $Q_k$ is set to a diagonal matrix. Among other things, $u_\omega$ and $u_b$ described above are used as diagonal elements. As regards the diagonal elements linked to the states for attitude and heading errors (the first three), the effects of the scale factor in the angular rate gyros are included. These scale factor errors are normally of the order of 2% and can cause major errors in integrated-out attitude and heading at high angular rates.

The measurements are five in number: three derived field vector components and roll and pitch angle calculated from air data. These measurements are obtained by using the relations (21) and (25).

As regards the measurement matrix $H_k$, relation (21) is used to fill out the three top lines. This results in the three top lines of the matrix having the appearance $$H_{k,1-3} = \begin{bmatrix} c_{13}B_y - c_{12}B_z & c_{11}B_z - c_{13}B_x & c_{12}B_x - c_{11}B_y & 0 & 0 & 0 & c_{11} & c_{12} & c_{13} \\ c_{23}B_y - c_{22}B_z & c_{21}B_z - c_{23}B_x & c_{22}B_x - c_{21}B_y & 0 & 0 & 0 & c_{21} & c_{22} & c_{23} \\ c_{33}B_y - c_{32}B_z & c_{31}B_z - c_{33}B_x & c_{32}B_x - c_{31}B_y & 0 & 0 & 0 & c_{31} & c_{32} & c_{33} \end{bmatrix} \tag{34}$$

For the last two lines of $H_k$ Eqn (25) is used, by differentiating the two right-hand parts with respect to all states in the second Kalman filter 22. As a result, the last two lines get the elements (the index designates row and column in that order)

$$h_{41} 1 - \frac{vg(c_{33}\omega_y - c_{32}\omega_z)(c_{11}^2 + c_{21}^2)}{g^2(c_{11}^2 + c_{21}^2)^2 + v^2(c_{33} \cdot \omega_z + c_{32} \cdot \omega_y)^2} \tag{35}$$

$$h_{42} = \frac{2vg(-c_{11}c_{13} - c_{21}c_{23})(c_{33}\omega_z + c_{32}\omega_y) - vg\omega_z c_{31}(c_{11}^2 + c_{21}^2)}{g^2(c_{11}^2 + c_{21}^2)^2 + v^2(c_{33} \cdot \omega_z + c_{32} \cdot \omega_y)^2} - \frac{c_{31}c_{32}}{c_{32}^2 + c_{33}^2}$$

$$h_{43} = \frac{2vg(c_{11}c_{12} - c_{21}c_{22})(c_{33}\omega_z + c_{32}\omega_y) + vg\omega_y c_{31}(c_{11}^2 + c_{21}^2)}{g^2(c_{11}^2 + c_{21}^2)^2 + v^2(c_{33} \cdot \omega_z + c_{32} \cdot \omega_y)^2} - \frac{c_{31}c_{33}}{c_{32}^2 + c_{33}^2}$$

$$h_{45} = \frac{vgc_{32}(c_{11}^2 + c_{21}^2)}{g^2(c_{11}^2 + c_{21}^2)^2 + v^2(c_{33} \cdot \omega_z + c_{32} \cdot \omega_y)^2}$$

$$h_{46} = \frac{vgc_{33}(c_{11}^2 + c_{21}^2)}{g^2(c_{11}^2 + c_{21}^2)^2 + v^2(c_{33} \cdot \omega_z + c_{32} \cdot \omega_y)^2} \text{ and}$$

$$h_{51} = \sin\left(\operatorname{atan}\frac{c_{32}}{c_{33}}\right)\alpha - \cos\left(\operatorname{atan}\frac{c_{32}}{c_{33}}\right)\beta \tag{36}$$

$$h_{52} = \frac{c_{33}}{\sqrt{1 - c_{31}^2}} + \frac{c_{32}c_{31}}{c_{32}^2 + c_{33}^2}\left(-\sin\left(\operatorname{atan}\frac{c_{32}}{c_{33}}\right)\alpha + \cos\left(\operatorname{atan}\frac{c_{32}}{c_{33}}\right)\beta\right)$$

$$h_{53} = -\frac{c_{32}}{\sqrt{1 - c_{31}^2}} + \frac{c_{33}c_{31}}{c_{32}^2 + c_{33}^2}\left(-\sin\left(\operatorname{atan}\frac{c_{32}}{c_{33}}\right)\alpha - \cos\left(\operatorname{atan}\frac{c_{32}}{c_{33}}\right)\beta\right).$$

The remaining elements in the fourth and fifth line are zero.

The simplest choice for the covariance matrix for the measurement noise $R_k$ is a diagonal matrix. The first four measurement noise elements have a standard deviation which is set typically to one-tenth. The fifth measurement noise element on the other hand has a standard deviation that is set to a function of the altitude derivative and the speed. The function is quite simply a scaled sum of the expression for calculating pitch angle and according to Eqn (25) differentiated with respect to the altitude derivative and the speed. The function is set to $$f(\dot{h}, v)5 \cdot \left|\frac{\partial \theta_{ref}}{\partial \dot{h}}\right| + 50 \cdot \left|\frac{\partial \theta_{ref}}{\partial v}\right| \qquad (37)$$

and gives a measure of the sensitivity of the pitch angle calculation to errors in the altitude derivative and the speed.

Since the errors in attitude and heading calculated with the aid of the integration routine grow rapidly, estimated attitude and heading errors must be fed back to the integration routine, which is done with wire 17. If this is not done, the error equations in the second Kalman filter 22 rapidly become invalid by reason of the fact that the equations are fundamentally non-linear. In addition, the estimates of the zero errors in the angular rate gyros are fed back via a wire 18. This results in better linearisation of the second Kalman filter 22 and furthermore the sampling frequency $f_s$ can be kept down.

In some flying situations the calculations that are performed in the second measurement routine 21 are inferior, either because the measurement equations are not sufficiently matched or because the measurement data is inherently poor. Calculation of the roll angle from air data is used only in level flight. No measurement is used if the angular rates are not sufficiently small, typically a couple of degrees or so per second. The measurement residuals are also checked, where the measurement residuals are not allowed to exceed typically one to two times the associated estimated uncertainty.

Symbols

Coordinate systems

I (Inertial frame): a system fixed in inertial space.

When flying above the surface of the earth it is customary for the centre of this system to coincide with the centre of the earth. This is really an approximation, since a system fixed in inertial space must not rotate. Because the earth rotates around the sun, the I-system will also rotate. However, the error that arises is negligible. The accelerations and angular rates measured by the sensors in an inertial navigation system are relative to that system.

N (Navigation frame): a system with its centre in the aircraft and with its xy plane always parallel to the surface of the earth.

The x-axis points to the north, the y-axis to the east and the z-axis vertically down towards the surface of the earth.

B (Body frame): a system in the aircraft, fixed to the body frame.

This coordinate system rotates with the aircraft. The x-axis points out through the nose, the y-axis through the starboard wing and the z-axis vertically down relative to the aircraft.

TABLE 1

Figure 4:
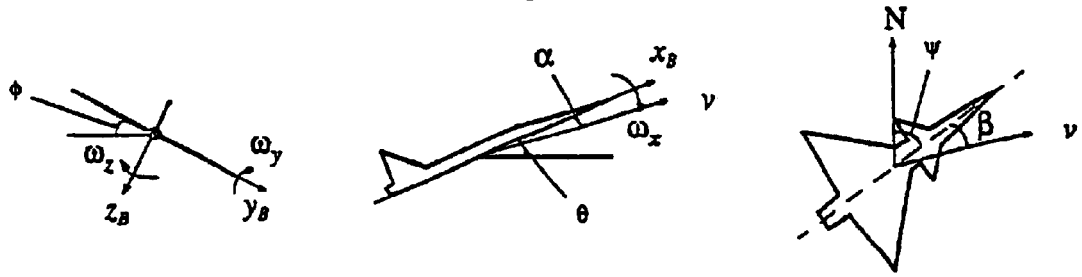
FIG. 4 shows in three pictures the attitude and heading of the aircraft and the axes in the body frame coordinate system, as well as the angle of attack and the sideslip angle.

Explanation of designations (symbols) for angles and angular rates. See also FIG. 4.

| | |
|---|---|
| $\phi$ | Angle between $y_B$ and the horizontal plane, tilted by the angle $\theta$ along $x_B$ (roll angle). |
| $\phi_0, \hat{\phi}$ | initial value for the roll angle and estimated roll angle, respectively |
| $\phi_{ref}$ | Roll angle calculated with the aid of data from air data and the heading derivative |

TABLE 1-continued

Explanation of designations (symbols) for angles and angular rates. See also FIG. 4.

| | |
|---|---|
| $\theta$ | Angle between $x_B$ and the horizontal plane (pitch angle). |
| $\theta_0, \hat{\theta}$ | Initial value for the pitch angle and estimated pitch angle, respectively |
| $\theta_{ref}$ | Pitch angle calculated with the aid of data from air data and the slip sensors |
| $\bar{\phi} = [\phi, \theta]^T$ | Compressed symbol for roll angle and pitch angle |
| $\hat{\bar{\phi}}, \bar{\phi}_0, \Delta\bar{\phi}$ | Respectively: estimated roll and pitch angle, estimated initial values for roll and pitch angle and difference between integrated-out and reference-calculated roll and pitch angle |
| $\phi_{ref}, \phi AHRS$ | Respectively: roll and pitch angle calculated with the aid of air data and primary data, and integrated-out roll and pitch angle, where integration is done with the aid of the angular rate gyro signals |
| $\psi, \psi^i$ | Respectively: angle between the projection of $x_B$ in the horizontal plane and north (heading angle), and discrete indexing of heading angle |
| $\alpha$ | Angle between air-related rate vector projected on the z-axis in body frame and projected on the x-axis in body frame (angle of attack) |
| $\beta$ | Angle between air-related velocity vector and air-related velocity vector projected on the y-axis in body frame (sideslip angle) |
| $C_B^N$ | Transformation matrix (3 × 3 matrix) which transforms a vector from body frame (actual) to navigation frame. The elements of this matrix are designated $c_{11}, c_{12}, c_{13}, c_{21}, c_{22}, c_{23}, c_{31}, c_{32}, c_{33}$, where the index designates row and column in that order |
| $C_B^N \cdot \tilde{C}_B^B = C_B^N = \hat{C}_B^N$ | Transformation matrix which transforms a vector from body frame (calculated) to navigation frame |
| $\delta C_B^N$ | Difference between calculated and true $C_B^N$ |
| $\gamma = (\gamma_x, \gamma_y, \gamma_z)^T$ | Rotation around, respectively, the x-, y- and z-axis in body frame, corresponding to the error between true and calculated body frame |
| $\Gamma$ | Anti-symmetrical matrix form of the vector $\gamma$ |
| $\omega_{IB} = \omega = (\omega_x, \omega_y, \omega_z)^T$ | Angular rate around, respectively, the x-, y- and z-axis in body frame (angular rate gyro signals). These angular rate components are customarily also designated $(p, q, r)^T$ |
| $W_{IB}$ | The vector $\omega_{IB}$ expressed in anti-symmetrical matrix form |
| $\delta\omega = \delta\omega_x, \delta\omega_y, \delta\omega_z)^T$ | Difference between actual and measured angular rate around, respectively, the x-, y- and z-axis in body frame |
| $W_{IN}$ | Rotation of navigation frame relative to inertial frame that occurs when moving over the curved surface of the earth. Anti-symmetrical matrix form |

TABLE 2

Explanation of symbols for the geomagnetic field.

| | |
|---|---|
| $B_x, B_y, B_z$ | Geomagnetic field vector components in body frame |
| $\delta B_x, \delta B_y, \delta B_z$ | Difference between measured and actual field vector components in body frame |
| $B_N, B_B$ | Geomagnetic field vector in navigation frame and body frame, respectively |

TABLE 3

Explanation of symbols used in connection with filters

| | |
|---|---|
| k, k + 1 | Used as an index, and represent the instant before and after time updating, respectively |
| n, n + 1 | Used to represent the present and subsequent sample, respectively |
| −, + | Used as art index, and represent the instant before and after measurement updating, respectively |
| x, z, P | State vector, measurement vector and estimate uncertainty matrix |
| w, Q | Process noise vector and covariance matrix for process noise, respectively |

TABLE 3-continued

Explanation of symbols used in connection with filters

| | |
|---|---|
| A, F | Prediction matrix in time-continuous and time-discrete form |
| K, H, R | Kalman gain matrix, measurement matrix and covariance matrix for measurement noise, respectively |
| $u_\omega, u_b, u_s$ | Driving noise for the Markov processes |
| $\tau_\omega, \tau_b, \tau_s, \tau,$ $\tau_1, \tau_2$ | Time-constants |
| $f_s$ | Sampling frequency |

TABLE 4

Figure 5:
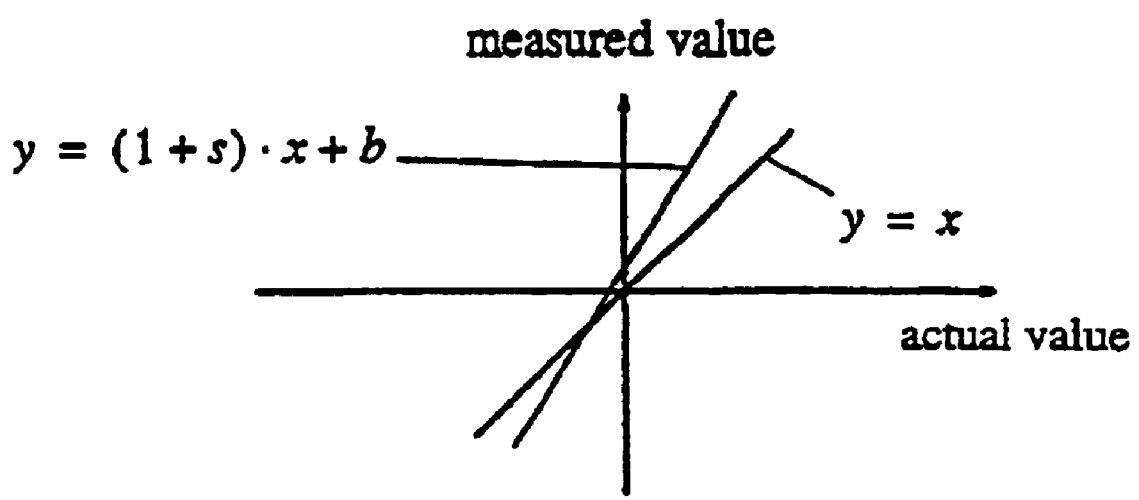
FIG. 5 shows how zero errors and scale factor errors impact the measured value.

Explanation of other symbols. See also FIG. 5.

| | |
|---|---|
| $b_x, b_y, b_z$ | Bias (zero errors) |
| $s_x, s_y, s_z$ | Scale factor errors |
| $k_{xy}, k_{xz}, k_{yx}, k_{yz},$ $k_{zx}, k_{zy}$ | Cross-connection errors (for example, index xy stands for how the y-component affects the x-component). Arise because the axes in triad are not truly orthogonal. |
| $h, \hat{h}$ | Altitude and low-pass-filtered time-derived altitude respectively |
| $v_t, v$ | True speed relative to the air |
| g | Gravity |

What is claimed is:

1. Method for synthetically calculating redundant attitude for an aircraft when a heading of the aircraft is known, using data existing in the aircraft, including angular rates p, q, r around x-, y- and z-coordinates of an aircraft-fixed (body frame) coordinate system, air data information including speed, altitude and angle of attack of the aircraft, and the heading information, wherein the method includes the steps:

calculating the attitude based on the aircraft-fixed angular rates p, q, r; and correcting the calculated attitude using the air data and the heading information.

2. Method according to claim 1, wherein the heading information is obtained from a heading gyro.

3. Method according to claim 1, wherein the step of calculating the attitude comprises the step of integrating out the attitude via information about the body-frame angular rates (p, q and r) obtained from the aircraft-fixed angular rate gyros of the aircraft.

4. Method according to claim 3, wherein correction of the integrated-out attitude takes place with the aid of attitude calculated on the basis of air data information and heading information.

5. Arrangement for synthetically calculating redundant attitude for an aircraft when a heading of the aircraft is known, using data existing in the aircraft, including body-frame angular rates (p, q and r) of the aircraft, air data including at least speed, altitude and angle of attack of the aircraft, and the heading information, wherein the arrangement includes an integration routine operable to integrate out the attitude of the aircraft from information about the body-frame angular rates (p, q and r) of the aircraft; and a correction routine operable to correct the calculated attitude using a reference attitude determined from air data and redundant heading information.

6. Arrangement according to claim 5, wherein the heading information is obtained from a heading gyro.

7. Arrangement according to claim 5, wherein the integration routine is further operable to integrate out the attitude of the aircraft from the body-frame angular rates (p, q and r) of the aircraft obtained from body-frame angular rate gyros of the aircraft.

8. Arrangement according to claim 7, wherein the integration routine receives a zero-error-compensated body-frame angular rate gyro signal.

9. Arrangement according to claim 5, wherein the correction routine if further operable to calculate a reference attitude using air data information and the redundant heading information.

10. Arrangement according to claim 5, further comprising a routine operable to obtain a synthetically-generated corrected attitude by generating a difference between the attitude obtained from the integration routine and an error signal that represents an error between the integrated attitude and the reference attitude.

* * * * *